United States Patent
Peng et al.

(10) Patent No.: US 12,481,414 B2
(45) Date of Patent: Nov. 25, 2025

(54) INFORMATION DISPLAY METHOD AND APPARATUS, ELECTRONIC DEVICE, AND COMPUTER READABLE MEDIUM

(71) Applicant: BEIJING BYTEDANCE NETWORK TECHNOLOGY CO., LTD., Beijing (CN)

(72) Inventors: Qiqi Peng, Beijing (CN); Qiheng Tian, Beijing (CN); Zesong Dong, Beijing (CN); Xiao Wang, Beijing (CN); Yu Song, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 60 days.

(21) Appl. No.: 17/736,012

(22) Filed: May 3, 2022

(65) Prior Publication Data
US 2022/0261127 A1 Aug. 18, 2022

Related U.S. Application Data

(63) Continuation of application No. PCT/CN2020/126128, filed on Nov. 3, 2020.

(30) Foreign Application Priority Data

Nov. 6, 2019 (CN) .......................... 201911077833.7

(51) Int. Cl.
*G06F 3/0483* (2013.01)
(52) U.S. Cl.
CPC .................. *G06F 3/0483* (2013.01)

(58) Field of Classification Search
None
See application file for complete search history.

(56) References Cited

U.S. PATENT DOCUMENTS 6,433,801 B1 * 8/2002 Moon .................. G06F 3/0482
  715/777
8,564,543 B2 * 10/2013 Chaudhri .............. G06F 1/1694
  345/173

(Continued)

FOREIGN PATENT DOCUMENTS

CN  101807202 A  8/2010
CN  102436496 A  5/2012

(Continued)

OTHER PUBLICATIONS

International Patent Application No. PCT/CN2020/126128; Int'l Search Report; dated Feb. 3, 2021; 2 pages.

(Continued)

*Primary Examiner* — William L Bashore
*Assistant Examiner* — Koorosh Nehchiri
(74) *Attorney, Agent, or Firm* — BakerHostetler (57) ABSTRACT

An information presenting method, an apparatus thereof, an electronic device, and a computer-readable medium are provided. The method includes: displaying a first information page, in which the first information page includes a first control and a second control, and the first control corresponds to a first tab page and a second tab page; and presenting, in response to detecting a first switching operation of switching a tab page displayed on the first information page from the first tab page to the second tab page, a tab of the second tab page in the second control.

12 Claims, 10 Drawing Sheets

(56) References Cited

U.S. PATENT DOCUMENTS

| | | | |
|---|---|---|---|
| 8,839,128 B2* | 9/2014 | Krishnaraj | G06F 16/743 345/592 |
| 8,988,353 B2* | 3/2015 | Shin | G06F 1/1694 715/806 |
| 9,241,080 B2* | 1/2016 | Lee | H04N 1/00177 |
| 9,529,487 B1* | 12/2016 | Bottner | G06F 3/0483 |
| 9,606,720 B1* | 3/2017 | Asver | G06F 3/04817 |
| 10,185,724 B2* | 1/2019 | Kim | G06F 16/5866 |
| 2006/0218500 A1 | 9/2006 | Sauve et al. | |
| 2006/0230356 A1 | 10/2006 | Sauve et al. | |
| 2007/0016543 A1* | 1/2007 | Epling | G06F 3/0481 |
| 2008/0005686 A1* | 1/2008 | Singh | G06F 3/04842 715/764 |
| 2010/0095219 A1* | 4/2010 | Stachowiak | G06F 16/9562 715/745 |
| 2014/0013271 A1* | 1/2014 | Moore | G06F 3/04883 715/792 |
| 2014/0189606 A1* | 7/2014 | Shuttleworth | G06F 3/04817 715/863 |
| 2014/0298239 A1 | 10/2014 | Jitkoff et al. | |
| 2015/0212670 A1* | 7/2015 | Chang | G06F 3/0483 715/777 |
| 2015/0277849 A1* | 10/2015 | Beaumier | A47B 81/06 715/716 |
| 2015/0293943 A1 | 10/2015 | Kim | |
| 2015/0346929 A1* | 12/2015 | Karunamuni | G06F 3/0488 715/777 |
| 2015/0347358 A1* | 12/2015 | Shultz | H04L 67/02 715/234 |
| 2016/0124595 A1* | 5/2016 | Kim | G06F 3/0483 715/769 |
| 2016/0132194 A1* | 5/2016 | Grue | G06F 16/5866 715/810 |
| 2017/0293419 A1* | 10/2017 | Dipin | G06F 16/957 |
| 2017/0371498 A1* | 12/2017 | Imade | G06F 3/0481 |
| 2018/0307390 A1 | 10/2018 | Fang et al. | |
| 2019/0079648 A1* | 3/2019 | Karunamuni | G06F 3/04842 |
| 2021/0019028 A1* | 1/2021 | Karunamuni | G06F 3/0488 |

FOREIGN PATENT DOCUMENTS

| | | |
|---|---|---|
| CN | 104133608 A | 11/2014 |
| CN | 104133619 A | 11/2014 |
| CN | 105446603 A | 3/2016 |
| CN | 105446618 A | 3/2016 |
| CN | 105677658 A | 6/2016 |
| CN | 106572161 A | 4/2017 |
| CN | 106649376 A | 5/2017 |
| CN | 107463366 A | 12/2017 |
| CN | 108153588 A | 6/2018 |
| CN | 108449261 A | 8/2018 |
| CN | 109154946 A | 1/2019 |
| CN | 109683754 A | 4/2019 |
| CN | 110046237 A | 7/2019 |
| CN | 110046238 A | 7/2019 |
| CN | 110083282 A | 8/2019 |
| CN | 110764671 A | 2/2020 |
| EP | 3028128 B1 | 12/2021 |
| JP | S62-022141 A | 1/1987 |
| JP | H10-020984 A | 1/1998 |
| JP | 2004-103006 A | 4/2004 |
| WO | WO 2015/014023 A1 | 2/2015 |

OTHER PUBLICATIONS

"Androids high imitation today's headlines, NetEase news home page dynamic change tab"; https://blog.csdn.net/wufeng55/article/details/53455941; CSDN; accessed May 3, 2022; 8 pages.

"Android's high imitation of today's headlines, Netease news home page dynamic change tab"; https://www.jianshu.com/p/a2e8895edf78?open_source=weibo_search; Jianshu; Dec. 2016; accessed Nov. 10, 2020; 11 pages.

"Android to achieve top + bottom dual navigation interface function"; https://blog.csdn.net/zhangjin12312/article/details/76690443; CSDN; Aug. 2017; 32 pages.

"The top tab bar and bottom navigation bar of the Android imitation Toutiao homepage"; https:/blog.csdn.net/WLMH_L/article/details/79108298; CSDN; Jan. 2018; 39 pages.

"Illustration of how to add friends from mobile phone address book in WeChat for Iphone"; https://www.jb51.net/softjc/385664.html; jb51; Oct. 2015; accessed Apr. 28, 2022; 8 pages.

"How to add friends from mobile phone address book in WeChat for Iphone"; https://www.docin.com/p-2229163021.html; docin; Jul. 2019; accessed Apr. 28, 2022; 4 pages.

"How to add friends from mobile phone address book in WeChat for iPhone"; https://www.pc841.com/shoujijigiao/16097.html; PC841; Jul. 2013; accessed Apr. 28, 2022; 12 pages.

European Patent Application No. 20884890.3; Extended Search Report; dated Nov. 22, 2022; 10 pages.

* cited by examiner

INFORMATION DISPLAY METHOD AND APPARATUS, ELECTRONIC DEVICE, AND COMPUTER READABLE MEDIUM

CROSS-REFERENCE TO RELATED APPLICATIONS

This application is a continuation of International Patent Application No. PCT/CN2020/126128, filed on Nov. 3, 2020, which claims the benefits of Chinese Patent Application No. 201911077833.7, filed on Nov. 6, 2019. The entire disclosure the applications is incorporated by reference as part of the disclosure of this application.

TECHNICAL FIELD

Embodiments of the present disclosure relate to a field of computer technology, and more particularly, to an information presenting method, an apparatus thereof, an electronic device, and a computer-readable medium.

BACKGROUND

The continuous development of Internet technology, especially the continuous popularization of electronic devices represented by smart phones, has greatly facilitated people's lives. Meanwhile, various applications installed on electronic devices are emerging one after another. Display modes of related applications are usually relatively fixed.

SUMMARY

The summary of the present disclosure serves to introduce concepts in a simplified form that are described in detail in the subsequent detailed description. The summary of the present disclosure is not intended to identify key features or essential features of the claimed technical solution, nor is it intended to limit the scope of the claimed technical solution.

Embodiments of the present disclosure provide an information presenting method, an apparatus thereof, an electronic device, and a computer-readable medium to solve the technical problems mentioned in the background above.

In a first aspect, embodiments of the present disclosure provide an information presenting method. The method includes: displaying a first information page, in which the first information page includes a first control and a second control, and the first control corresponds to a first tab page and a second tab page; and presenting, in response to detecting a first switching operation of switching a tab page displayed on the first information page from the first tab page to the second tab page, a tab of the second tab page in the second control.

In a second aspect, embodiments of the present disclosure provide an information presenting apparatus. The apparatus includes: a display apparatus, configured to display a first information page, in which the first information page includes a first control and a second control, and the first control corresponds to a first tab page and a second tab page; and the display apparatus is further configured to present, in response to detecting a first switching operation of switching a tab page displayed on the first information page from the first tab page to the second tab page, a tab of the second tab page in the second control.

In a third aspect, embodiments of the present disclosure provide an electronic device. The electronic device includes one or more processors; and a storage apparatus, having one or more programs stored thereon, in which, the one or more programs, when executed by the one or more processors, cause the one or more processors to perform the methods mentioned above.

In a fourth aspect, embodiments of the present disclosure provide a computer-readable medium with a computer program stored thereon, in which, when executed by the processor, the program implements the methods mentioned above.

In a fourth aspect, embodiments of the present disclosure provide a computer program which includes a program code, in which, when executed by a computer, the program code implements the methods mentioned above.

One embodiment of the above-described respective embodiments of the present disclosure has beneficial effects below: by presenting a tab of a second tab page in a second control, dynamic association between the tab presented in the second control and a tab page switching operation is implemented, which enriches presenting modes of the page, especially the tab. In addition, in response to the switching operation, adaptive tab presentation is performed, which improves interactivity of the page.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numbers refer to the same or similar elements. It should be understood that the drawings are schematic and that the originals and elements are not necessarily drawn to scale.

DETAILED DESCRIPTION

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein. Rather, these embodiments are provided for a thorough and complete understanding of the present disclosure. It should be understood that the drawings and embodiments of the present disclosure are only for exemplary purposes, and are not intended to limit the protection scope of the present disclosure.

In addition, it should be noted that, for the convenience of description, only the parts related to the inventions are shown in the drawings. The embodiments of this disclosure and features of the embodiments may be combined with each other without conflict.

It should be noted that the concepts such as "first" and "second" mentioned in the present disclosure are only used to distinguish different devices, modules or units, and are not used to limit the order of functions performed by these devices, modules or units or interdependence.

It should be noted that the modifications of "a" and "multiple" mentioned in the present disclosure are illustrative rather than restrictive, and those skilled in the art should understand that unless the context clearly indicates otherwise, they should be understood as "one or multiple".

The names of messages or information exchanged between multiple devices in the embodiments of the present disclosure are only for illustrative purposes, and are not intended to limit the scope of these messages or information.

Figure 1A:
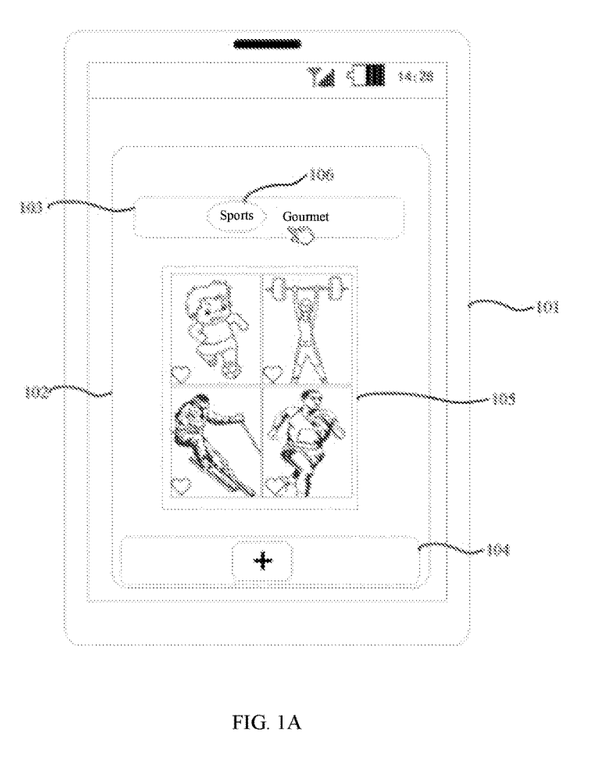
FIG. 1A and FIG. 1B are schematic diagrams of an application scenario of an information presenting method according to embodiments of the present disclosure.
Figure 1B:
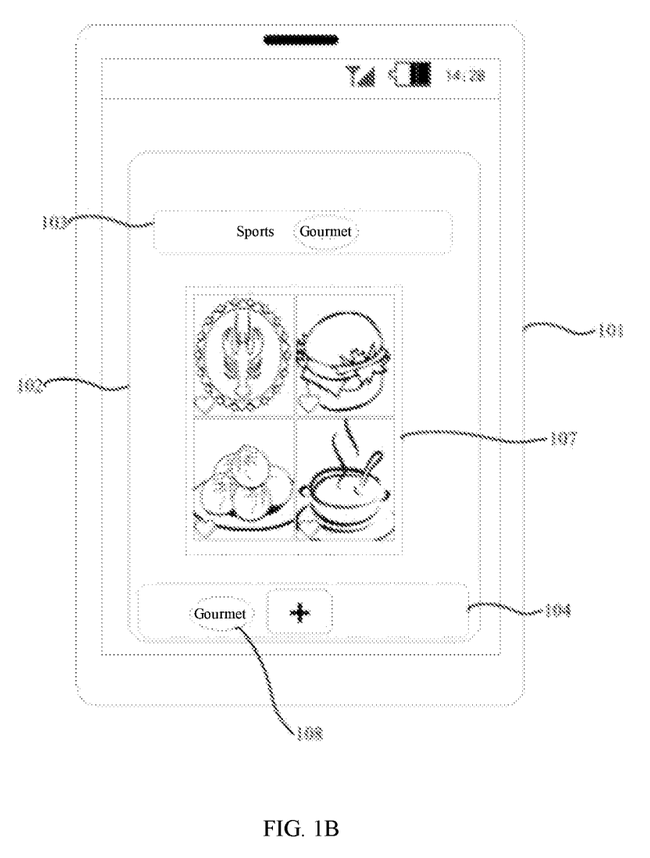

FIG. 1A and FIG. 1B show schematic diagrams of an application scenario of an information presenting method to which embodiments of the present disclosure may be applied.

The information presenting method provided by embodiments of the present disclosure is usually executed by a terminal device. It should be noted that the terminal device may be hardware or software. When the terminal device is hardware, it may be various electronic devices that support video processing, including but not limited to, smart phones, tablet personal computers, e-book readers, vehicle-mounted terminals, etc. When the terminal device is software, it may be installed in the electronic devices as listed above. It may be implemented, for example, as a plurality of pieces of software or software modules for supplying distributed services, or may also be implemented as a single piece of software or software module, which will not be specifically limited here.

As shown in FIG. 1A, an executing body of the information presenting method may be a video playback application installed on a smart phone 101. Therefore, the video playback application may display a first information page 102 through a screen of the smart phone 101. The first information page 102 includes a first control 103 and a second control 104. As an example, the first control 103 is a tab page switching control, where, switching between two corresponding tab pages may be implemented through the first control 103. The two tab pages corresponding to the first control 103 are respectively a first tab page 105 and a second tab page (not shown in FIG. 1A). As shown in the diagram, a tab page currently displayed on the first information page 102 is the first tab page 105. Optionally, tabs of the two tab pages may be presented on the first control 103. In the scenario, the tab of the first tab page 105 is "Sports", as shown by 106 in the diagram. The tab of the second tab page (not shown in FIG. 1A) is "Gourmet". Optionally, the second control 104 may be various types of controls. As an example, the second control 104 may be a control for triggering video shooting.

On this basis, with continued reference to FIG. 1B, a user may switch the tab page displayed on the first information page 102 from the first tab page 105 to the second tab page 107 through an operation such as clicking or sliding. As an example, it may be a first switching operation of clicking the tab "Gourmet" in the diagram. In response to the first switching operation, the tab "Gourmet" of the second tab page 107 may be presented in the second control 104, as shown by 108 in the diagram.

Figure 2:
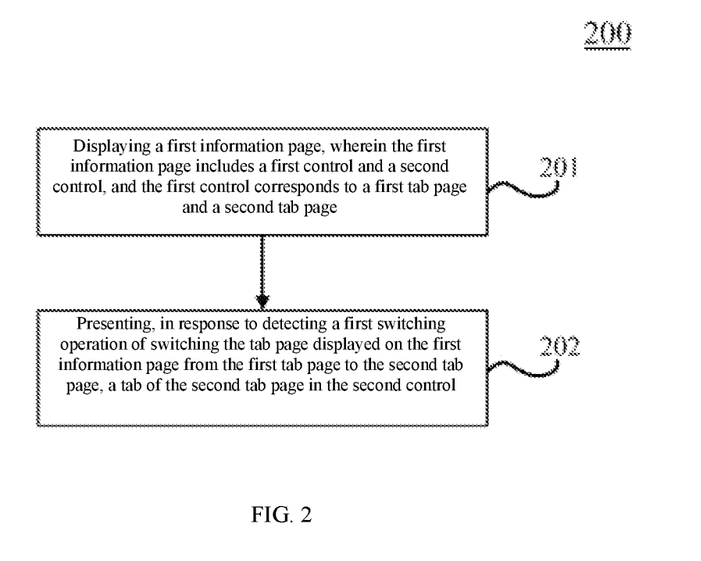
FIG. 2 is a flow chart of embodiments of an information presenting method according to embodiments of the present disclosure.

With continued reference to FIG. 2, a flow 200 according to some embodiments of information presenting method of the present disclosure is shown. The information presenting method includes steps of:

Step 201: displaying a first information page, in which, the first information page includes a first control and a second control, and the first control corresponds to a first tab page and a second tab page.

In some embodiments, an executing body of the information presenting method may display the first information page. The first information page may be various pages on which various types of information may be presented. For example, it may be a video streaming playback page, a news browsing page, etc. The first information page may contain the first control and the second control. According to actual needs, the first control and the second control may be controls for implementing various functions. The first control corresponds to the first tab page and the second tab page.

As an example, the first control may be a page indicating control. The first control is used to indicate a currently displayed tab page. For example, the first control may display tab, serial number, identifier, etc. of the currently displayed tab page. A page corresponding to the first control may be a plurality of pages that support switching.

As an example, the second control may be a control for triggering video shooting. As an example, the second control may be a control for triggering comment input, etc.

In some optional implementations of the embodiments, the first control and/or the second control is a tab page switching control. In practice, the tab page switching control may be implemented through methods supplied by some programming tools (e.g., Pager Tab Strip, View Pager), thus, switching between the plurality of tab pages corresponding to the tab page switching control may be implemented through an operation such as clicking or sliding. In practice, the tab page switching control is also referred to as an interactive page indicating control, a page indicator, etc. By operating the first control and/or the second control, switching between the tab pages is implemented, which further improve operability and interactivity, and enriches functions of the pages.

On the basis of displaying the first information page, the user may switch between the first tab page and the second tab page through an operation such as sliding or clicking on the first control. It should be noted that the first tab page and the second tab page are only convenient for describing two tab pages, and do not constitute any limitation on the tab pages per se and an order between the two tab pages.

Figure 3:
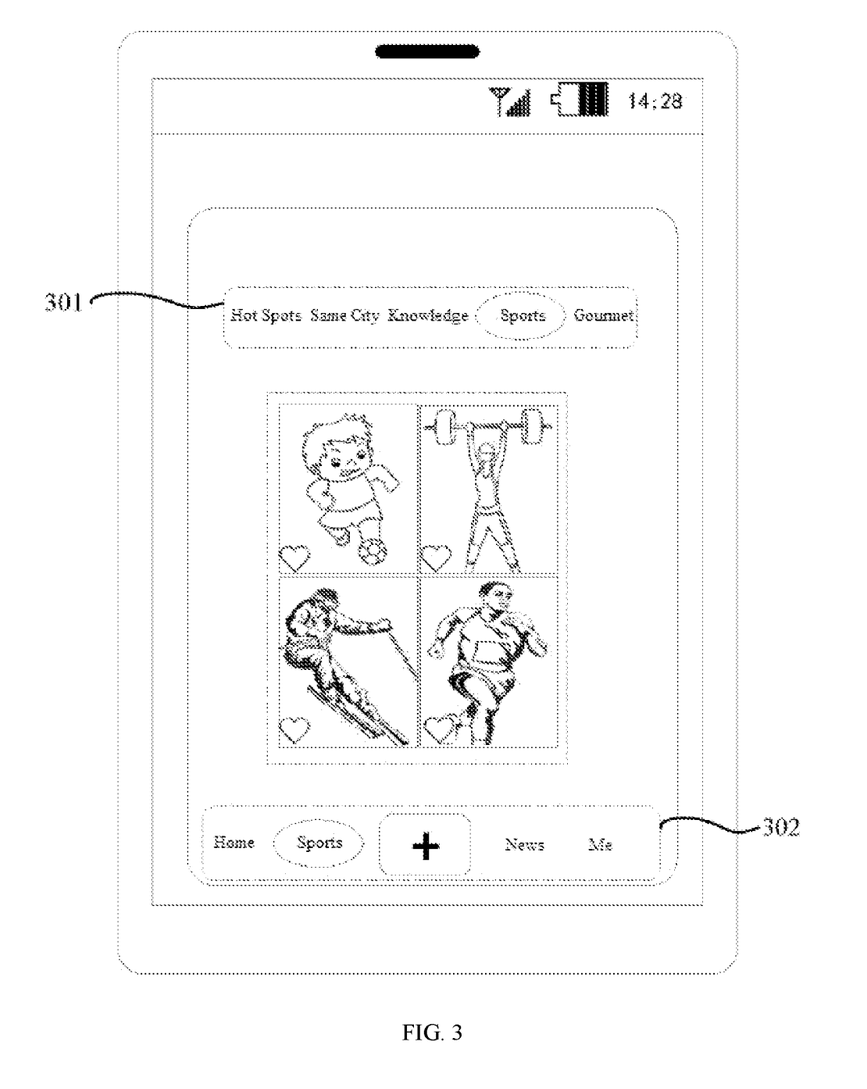
FIG. 3 is an exemplary schematic diagram of tab pages corresponding to a first control and a second control according to embodiments of the present disclosure.

In some optional implementations of some embodiments, the first control may also correspond to more than two tab pages. The second control may also correspond to a plurality of tab pages. As an example, as shown in FIG. 3, tabs corresponding to a first control 301 are respectively five tab pages of "Hot Spots", "Same City", "Knowledge", "Sports" and "Gourmet". Tabs corresponding to a second control 302 are respectively tab pages of "Home", "Sports", "News", and "Me" as well as a video shooting page. In these implementations, the first control and the second control respectively correspond to a plurality of tab pages, so as to adapt to different scenario requirements.

Step 202: presenting, in response to a first switching operation of switching the tab page displayed on the first information page from the first tab page to the second tab page is detected, a tab of the second tab page in the second control.

In some embodiments, in response to detecting that the first switching operation of switching the tab page displayed on the first information page from the first tab page to the second tab page, the tab of the second tab page may be presented in the second control.

In optional implementations of some embodiments, the tab of the second tab page may be presented in a preset position of the second control. In practice, before the first switching operation, the preset position may present the tab of the first tab page; a preset content; or no content may be presented at the present position, which will not be limited in the present application.

In optional implementations of some embodiments, the presenting, in response to detecting the first switching operation of switching the tab page displayed on the first information page from the first tab page to the second tab page, the tab of the second tab page in the second control, includes: switching, in response to detecting the first switching operation of switching the tab page displayed on the first information page from the first tab page to the second tab page, the tab page displayed on the first information page from the first tab page to the second tab page. On this basis, in response to switching the tab page displayed on the first information page from the first tab page to the second tab page, the tab of the second tab page is presented in the second control.

In the information presenting method provided by some embodiments of the present disclosure, by presenting the tab of the second tab page in the second control, dynamic association between the tab presented in the second control and the tab page switching operation is implemented, which enriches presenting modes of pages, especially tabs. In addition, in response to the switching operation, adaptive tab presentation is performed, which can improve interactivity of the pages.

Figure 4:
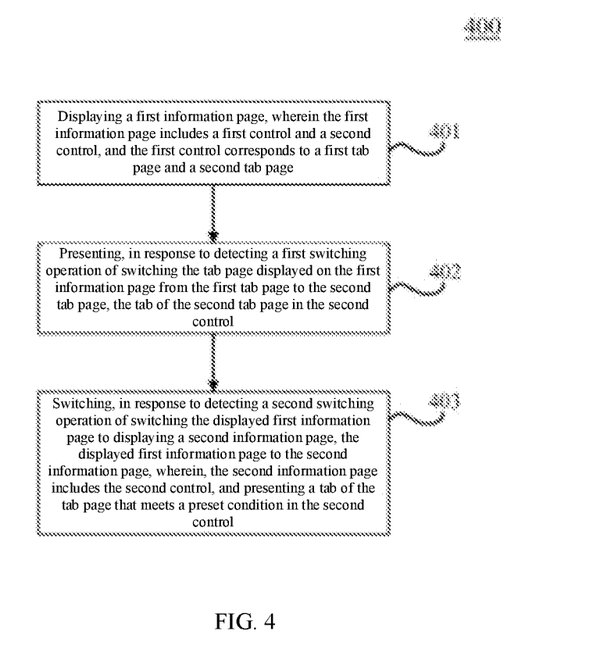
FIG. 4 is a flow chart of some other embodiments of an information presenting method according to embodiments of the present disclosure.

Further referring to FIG. 4, a flow 400 according to some other embodiments of the information presenting method is shown. The flow 400 of the information presenting method includes steps of:

Step 401: displaying a first information page, in which, the first information page includes a first control and a second control, and the first control corresponds to a first tab page and a second tab page.

Step 402: presenting, in response to detecting a first switching operation of switching the tab page displayed on the first information page from the first tab page to the second tab page, the tab of the second tab page in the second control.

In some embodiments, steps 201 to 202 in those embodiments corresponding to FIG. 2 may be referred to for specific implementation of steps 401 to 402 and technical effects brought about thereby, and no details will be repeated here.

Step 403: switching, in response to detecting a second switching operation of switching the displayed first information page to displaying a second information page, the displayed first information page to the second information page, in which, the second information page includes the second control, and presenting a tab of the tab page that meets a preset condition in the second control.

Figure 5:
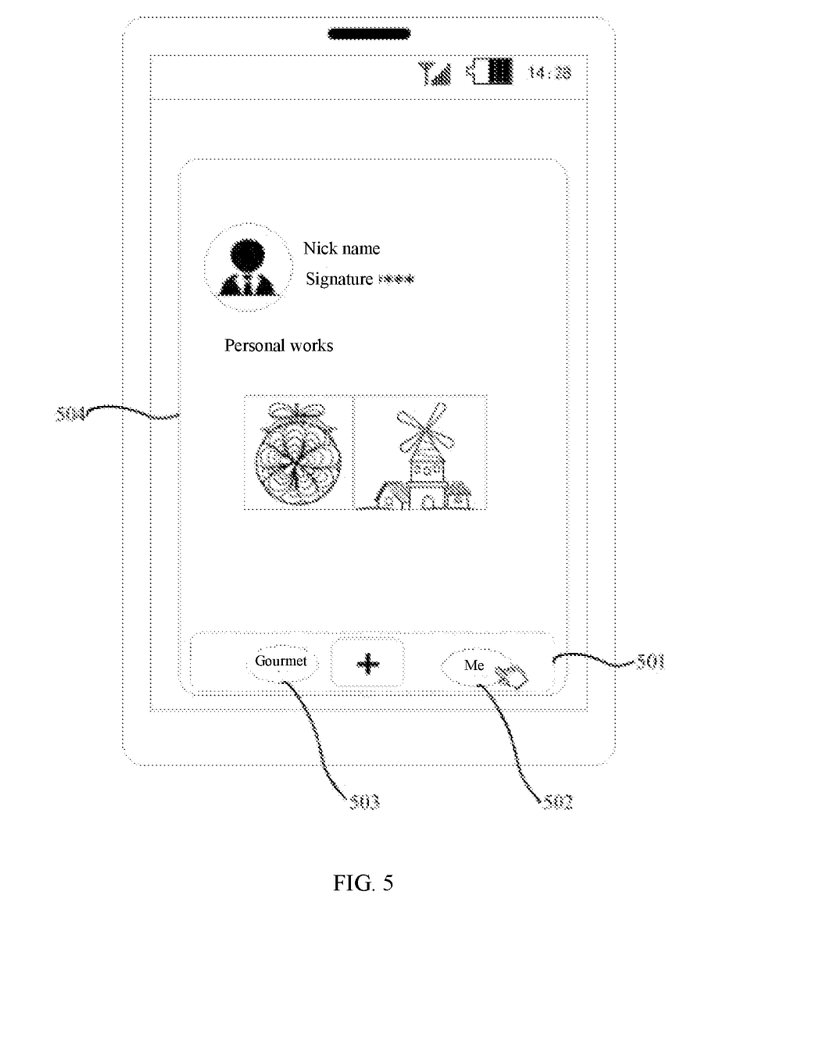
FIG. 5 is a schematic diagram of another application scenario of an information presenting method according to embodiments of the present disclosure.

In some embodiments, on the basis of step 402, the user may switch the first information page to the second information page through an operation such as clicking or sliding. As an example, as shown in FIG. 5, in a case where three tabs presented in the second control 501 are respectively the tab 503 "Gourmet", the tab 502 "Me" and the video shooting tab, the user may click the tab 502 "Me" in the second control to switch to the second information page (a personal information page) 504. The second information page 504 contains the second control. It should be noted that other operations, for example, a sliding operation in the first information page, may also be used to switch the first information page to the second information page without depending on the second control in the first information page.

On this basis, the tab of the tab page that meets the preset condition may be presented in the second control. According to actual needs, the preset condition may be various conditions. As an example, the tab page that meets the preset condition is the second tab page. Thus, the tab of the second tab page may continue to be displayed.

In optional implementations of some embodiments, the tab page that meets the preset condition may be one of the following: a tab page presented last before the second switching operation, a tab page with longest dwell time within a preset time period before the second switching operation, a tab page with most user interactions within the preset time period before the second switching operation, and a tab page of an associated user of the user that has longest dwell time within the preset time period before the second switching operation.

In optional implementations of some embodiments, the tab of the tab page that meets a preset condition is presented in the preset position of the second control.

In the information presenting method according to some embodiments corresponding to FIG. 4, in response to the second switching operation, the tab of the tab page that meets the preset condition is presented in the second control. In practice, an appropriate preset condition may be set to implement a corresponding function. For example, the tab page that meets the preset condition may be the tab page presented last before the second switching operation. Therefore, the user operation may be memorized, which is convenient for the user's subsequent operation.

Figure 6:
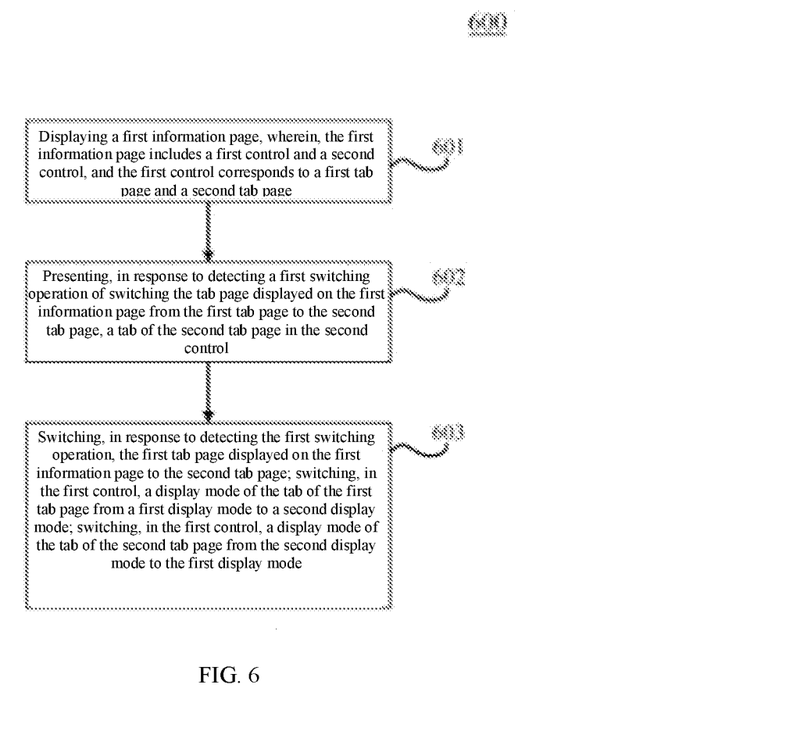
FIG. 6 is a flow chart of some further embodiments of an information presenting method according to embodiments of the present disclosure.

Further referring to FIG. 6, a flow 600 of some other embodiments of the information presenting method is shown. The flow 600 of the information presenting method includes steps of:

Step 601: displaying a first information page, in which, the first information page includes a first control and a second control, and the first control corresponds to a first tab page and a second tab page.

Step 602: presenting, in response to detecting a first switching operation of switching the tab page displayed on the first information page from the first tab page to the second tab page, a tab of the second tab page in the second control.

Step 603: switching, in response to detecting the first switching operation, the first tab page displayed on the first information page to the second tab page; switching, in the first control, a display mode of the tab of the first tab page from a first display mod to a second display mode; switching, in the first control, a display mode of the tab of the second tab page from the second display mode to the first display mode.

Figure 7:
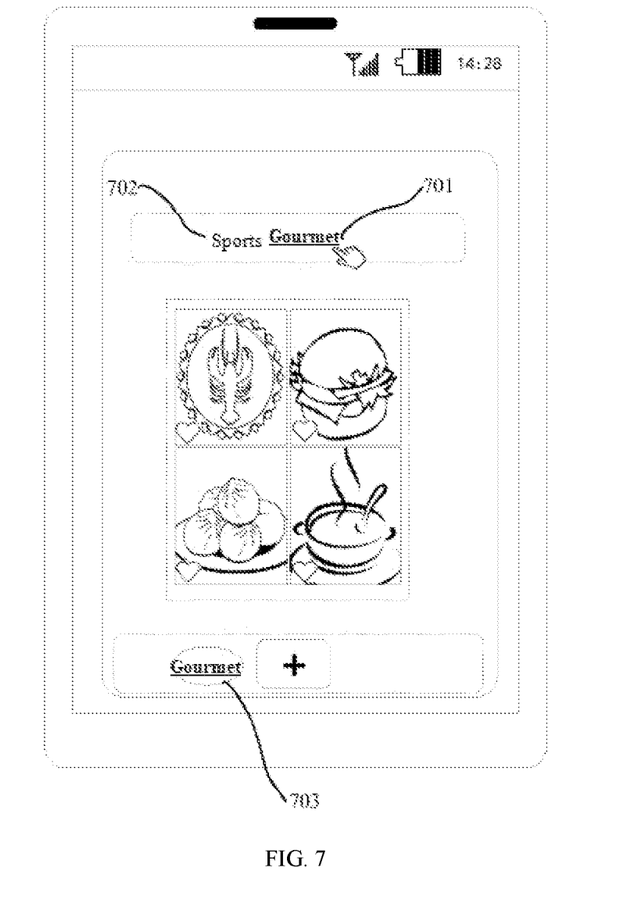
FIG. 7 is a schematic diagram of still another application scenario of an information presenting method according to embodiments of the present disclosure.

In some embodiments, in response to detecting the first switching operation, the executing body may switch the first tab page displayed on the first information page to the second tab page. In addition, in the first control, the display mode of the tab of the first tab page may also be switched from the first display mode to the second display mode. As an example, the first display mode may be an enhanced display mode. For example, the first display mode may be a display style such as bold, underline, highlight, etc. As an example, the second display mode may be a weakened display mode. For example, the second display mode may be a display style such as no underline, no bold, no highlight, etc. As an example, referring to FIG. 7, the user may perform a click operation to switch the sports tab page to the gourmet tab page. A tab 702 of the sports tab page is shown as "Sports". A tab 701 of the gourmet tab page is shown as "Gourmet". In response to detecting a click operation on the tab 701 "Gourmet", the display mode of the tab 702 "Sports" may be switched from "bold, underline" to "no bold, no underline". On the other hand, the display mode of the tab 701 "Gourmet" is switched from "no bold, no underline" to "bold, underline".

In some embodiments, the presenting, in response to detecting the first switching operation, the tab of the second tab page in the second control, includes: displaying the tab of the second tab page in the second control through the first display mode. As an example, with continued reference to FIG. 7, the tab 703 "Gourmet" is displayed in the second control through the first display mode, that is, "bold, underlined".

Figure 8:
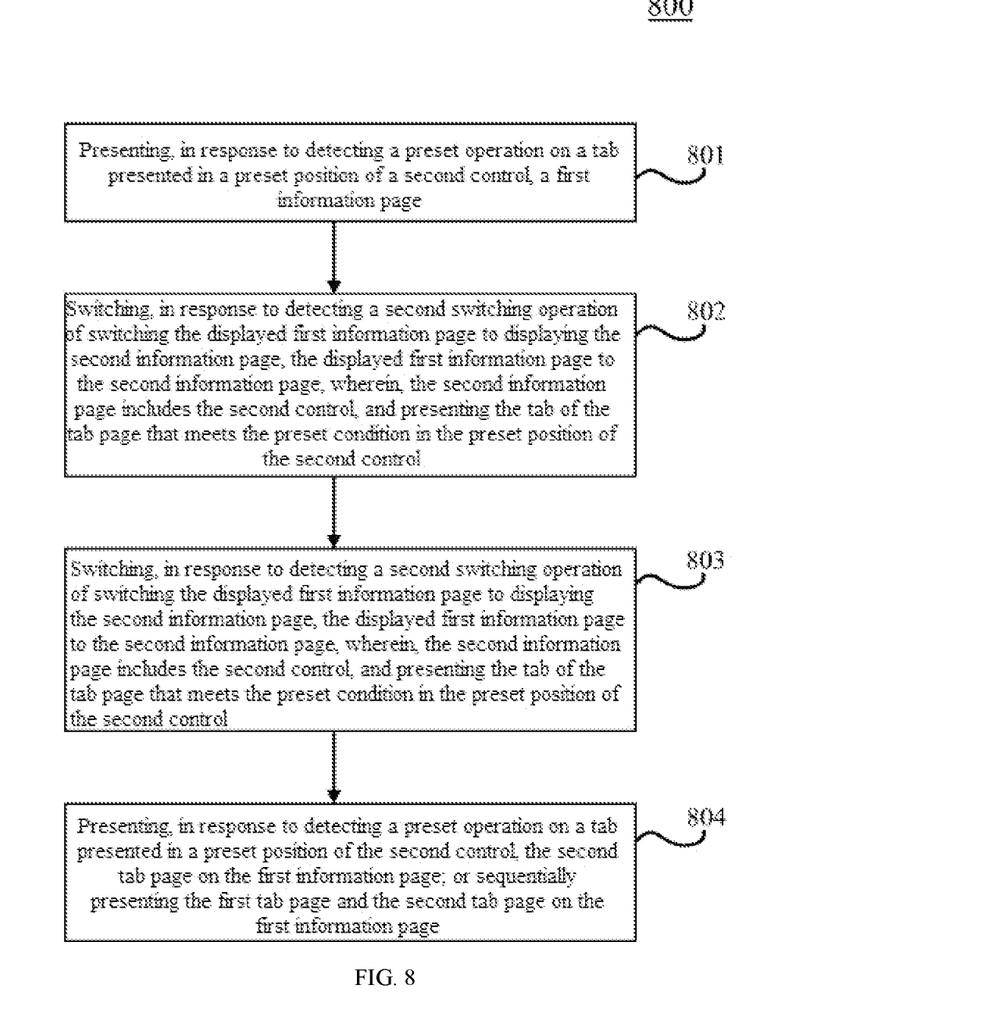
FIG. 8 is a flow chart of some further embodiments of an information presenting method according to embodiments of the present disclosure.

Further referring to FIG. 8, a flow 800 of some further embodiments of the information presenting method is shown. The flow 800 of the information presenting method includes steps of:

Step 801: presenting, in response to detecting a preset operation on a tab presented in a preset position of a second control, a first information page.

Step 802: presenting, in response to detecting a first switching operation of switching the tab page displayed on the first information page from the first tab page to the second tab page, the tab of the second tab page in the second control.

Step 803: switching, in response to detecting a second switching operation of switching the displayed first information page to displaying the second information page, the displayed first information page to the second information page, in which, the second information page includes the second control, and presenting the tab of the tab page that meets the preset condition in the preset position of the second control.

In some embodiments, steps 401 to 403 in those embodiments corresponding to FIG. 4 may be referred to for specific implementation of steps 801 to 803 and technical effects brought about thereby, and no details will be repeated here.

Step 804: presenting, in response to detecting a preset operation on a tab presented in a preset position of the second control, a second tab page on the first information page; or sequentially presenting the first tab page and the second tab page on the first information page.

In some embodiments, in response to detecting a preset operation of a tab presented in a preset position of the second control, the executing body of the information presenting method may present the second tab page on the first information page. Optionally, the first tab and the second tab page may also be presented sequentially on the first information page.

In these embodiments, the user may implement presentation of the second tab page on the first information page by clicking the tab presented in the preset position of the second control or other operations. Thus, the function of the tab presented in the preset position of the second control is increased, to provide a new interactive entry.

Figure 9:
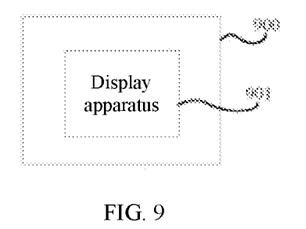
FIG. 9 is a flow chart of embodiments of an information presenting apparatus according to embodiments of the present disclosure.

Further referring to FIG. 9, as implementation of the methods shown in the above-described respective diagrams, the present disclosure provides an information presenting apparatus in some embodiments; these apparatus embodiments correspond to those method embodiments shown in FIG. 2; and the apparatus may be specifically applied to various electronic devices.

As shown in FIG. 9, the information presenting apparatus 900 according to some embodiments includes: a display apparatus 901. The display apparatus 901 is configured to display a first information page, in which, the first information page includes a first control and a second control, and the first control corresponds to a first tab page and a second tab page. In addition, the display apparatus 901 is further configured to present, in response to detecting a first switching operation of switching the tab page displayed on the first information page from the first tab page to the second tab page, a tab of the second tab page in the second control.

In optional implementations of some embodiments, the first control and/or the second control is a tab page switching control.

In optional implementations of some embodiments, the display apparatus 901 is further configured to switch the first tab page displayed on the first information page to the second tab page; switch, in the first control, a display mode of the tab of the first tab page from a first display mode to a second display mode; and switch, in the first control, a display mode of the tab of the second tab page from the second display mode to the first display mode; and/or the presenting the tab of the second tab page in the second control includes: displaying the tab of the second tab page in the second control through the first display mode.

In optional implementations of some embodiments, the display apparatus 901 is further configured to: switch, in response to detecting a second switching operation of switching the displayed first information page to displaying a second information page, the displayed first information page to the second information page, in which, the second information page includes a second control; and present a tab of the tab page that meets a preset condition in the second control.

In optional implementations of some embodiments, the display apparatus 901 is further configured to: present the tab of the second tab page in a preset position of the second control; and present the tab of the tab page that meets the preset condition in the preset position of the second control.

In optional implementations of some embodiments, the tab page that meets the preset condition may be one of the following: a tab page presented last before the second switching operation, a tab page with longest dwell time within a preset time period before the second switching operation, a tab page with most user interactions within the preset time period before the second switching operation, and a tab page of an associated user of the user that has longest dwell time within the preset time period before the second switching operation.

In optional implementations of some embodiments, the tab page that meets the preset condition is the second tab page.

In optional implementations of some embodiments, the display apparatus 901 is further configured to: present, in response to detecting a preset operation on the tab presented in the preset position of the second control, the first information page.

In optional implementations of some embodiments, the display apparatus 901 is further configured to: present the second tab page on the first information page; or sequentially present the first tab page and the second tab page on the first information page.

In some embodiments, by presenting the tab of the second tab page in the second control, dynamic association between the tab presented in the second control and the tab page switching operation is implemented, which can enrich presenting modes of pages, especially tabs. In addition, in response to the switching operation, adaptive tab presentation is performed, which can improve interactivity of the page.

Hereinafter, referring to FIG. 10, it shows a structural schematic diagram of an electronic device 1000 suitable for implementing some embodiments of the present disclosure. The terminal device according to some embodiments of the present disclosure may include, but not limited to, a mobile terminal such as a mobile phone, a laptop, a digital broadcast receiver, a Personal Digital Assistant (PDA), a Portable Android Device (PAD), a Portable Multimedia Player (PMP), a vehicle-mounted terminal (e.g., a vehicle-mounted navigation terminal), etc., and a stationary terminal such as a digital TV, a desktop computer, etc. The electronic device shown in FIG. 10 is only an example, and should not impose any limitation on the function and use scope of the embodiments of the present disclosure.

Figure 10:
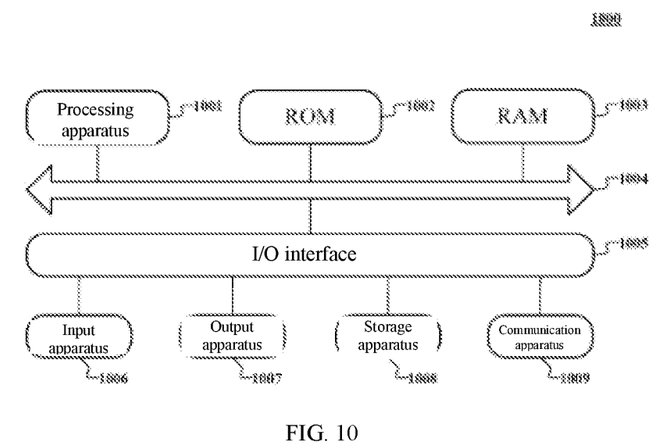
FIG. 10 is a structural schematic diagram of an electronic device suitable for implementing embodiments of the present disclosure.

As shown in FIG. 10, the electronic device 1000 may include a processing apparatus (e.g., a central processing unit, a graphics processor, etc.) 1001, which may execute various appropriate actions and processing according to a program stored in a Read-Only Memory (ROM) 1002 or a program loaded from a storage device 1008 into a Random Access Memory (RAM) 1003. The Random Access Memory (RAM) 1003 further stores various programs and data required for operation of the electronic device 1000. The processing apparatus 1001, the ROM 1002, and the RAM 1003 are connected with each other through a bus 1004. An input/output (I/O) interface 1005 is also coupled to the bus 1004.

Usually, apparatuses below may be coupled to the I/O interface 1005: input apparatuses 1006 including, for example, a touch screen, a touch pad, a keyboard, a mouse, a camera, a microphone, an accelerometer, a gyroscope, etc.; output apparatuses 1007 including, for example, a Liquid Crystal Display (LCD), a speaker, a vibrator, etc.; storage apparatuses 1008 including, for example, a memory card, etc.; and a communication apparatus 1009. The communication apparatus 1009 may allow the electronic device 1000 to perform wireless or wired communication with other electronic device so as to exchange data. Although FIG. 10 shows the electronic device 1000 having various apparatuses, it should be understood that it is not required to implement or have all the apparatuses shown, and the electronic device 1000 may alternatively implement or have more or fewer apparatuses. Each block shown in FIG. 10 may represent one apparatus, or may also represent plurality of apparatuses as needed.

Particularly, according to some embodiments of the present disclosure, the flows as described above with reference to the flow charts may be implemented as computer software programs. For example, some embodiments of the present disclosure include a computer program product, including a computer program carried on a computer-readable medium, the computer program containing program codes for executing the method illustrated in the flow chart. In such embodiments, the computer program may be downloaded and installed from the network via the communication apparatus 1009, or installed from the storage apparatus 1008, or installed from the ROM 1002. When executed by the processing apparatus 1001, the computer program executes the above-described functions limited in the methods according to some embodiments of the present disclosure.

It should be noted that, the computer-readable medium according to some embodiments of the present disclosure may be a computer-readable signal medium or a computer-readable storage medium, or any combination thereof. The computer-readable storage medium may be, for example, but not limited to, an electronic, magnetic, optical, electromagnetic, infrared, or semiconductor system, apparatus, or device, or any suitable combination thereof. More specific examples of the computer-readable storage medium may include, but not limited to: an electrical connection having one or more conductors, a portable computer diskette, a hard disk, a Random Access Memory (RAM), a Read-Only Memory (ROM); an Erasable Programmable Read-Only Memory (EPROM or Flash memory); an optical fiber, a Portable Compact Disc Read-Only Memory (CD-ROM); an optical storage device; a magnetic storage device; or any suitable combination thereof. In some embodiments of the present disclosure, a computer-readable storage medium may be any tangible medium that contains or stores a program that may be used by or in conjunction with an instruction executing system, an apparatus, or a device. Rather, in some embodiments of the present disclosure, the computer-readable signal medium may include a data signal propagated in baseband or as a portion of a carrier wave, which carries a computer-readable program code therein. Such propagated data signals may take a variety of forms, including but not limited to, electromagnetic signals, optical signals, or any suitable combination thereof. The computer-readable signal medium may also be any computer-readable medium other than a computer-readable storage medium; and the computer-readable signal medium may transmit, propagate, or transport programs for use by or in combination with the instruction executing system, the apparatus, or the device. The program code embodied on the computer-readable medium may be transmitted by using any suitable medium, including, but not limited to, an electrical wire, an optical cable, a Radio Frequency (RF), etc., or any suitable combination thereof.

In some implementations, the client and the server may communicate with any network protocol currently known or to be researched and developed in the future such as HyperText Transfer Protocol (HTTP), and may communicate (via a communication network) and interconnect with digital data in any form or medium. Examples of communication networks include a Local Area Network ("LAN"), a Wide Area Network ("WAN"), the Internet, and an end-to-end network (e.g., an ad hoc end-to-end network), as well as any network currently known or to be researched and developed in the future.

The above-described computer-readable medium may be included in the above-described electronic device; or may also exist alone without being assembled into the electronic device. The above-described computer-readable medium carries one or more programs, and when the one or more programs are executed by the electronic device, the electronic device is cause to: determine, in response to receiving a text to be tabbed selected by a user in a candidate text, whether the text to be tabbed supports being tabbed; determining, in response to determining that the text to be tabbed supports being tabbed, a presentation position of the text to be tabbed and corresponding tabbing information in a list of relevant tabbing information corresponding to the candidate text; present the text to be tabbed in association with the determined presentation position and the tabbing information corresponding to the text to be tabbed.

The computer program codes for executing the operations according to some embodiments of the present disclosure may be written in one or more programming languages or a combination thereof; the above-described programming languages include object-oriented programming languages such as Java, Smalltalk, C++, and also include conventional procedural programming languages such as "C" language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a Local Area Network (LAN) or a Wide Area Network (WAN), or the connection may be made to an external computer (for example, through the Internet using an Internet Service Provider).

The flow chart and block diagrams in the accompanying drawings illustrate the architecture, functionality, and operation of possible implementations of systems, methods, and computer program products according to various embodiments of the present disclosure. In this regard, each block in the flow chart or block diagrams may represent a module, a program segment, or a portion of codes, which includes one or more executable instructions for implementing specified logical function(s). It should also be noted that, in some alternative implementations, the functions noted in the block may occur out of the order noted in the accompanying drawings. For example, two blocks shown in succession may, in fact, be executed substantially concurrently, or the blocks may sometimes be executed in a reverse order, depending upon the functionality involved. It should also be noted that, each block of the block diagrams and/or flow charts, and combinations of blocks in the block diagrams and/or flow charts, may be implemented by special purpose hardware-based systems that execute the specified functions or operations, or may also be implemented by a combination of special purpose hardware and computer instructions.

The units as described in some embodiments of the present disclosure may be implemented by means of software, or may also be implemented by means of hardware. The described unit may also be provided in a processor, which, for example, may be described as: a processor, including a display unit. Names of these units do not constitute a limitation on the units per se in some cases, for example, the display unit may also be described as "a unit that displays the first information page".

The functions described herein above may be executed, at least partially, by one or more hardware logic components. For example, without limitation, available exemplary types of hardware logic components include: a Field Programmable Gate Array (FPGA), an Application Specific Integrated Circuit (ASIC), an Application Specific Standard Product (ASSP), a System on Chip (SOC), a Complex Programmable Logical Device (CPLD), etc.

According to one or more embodiments of the present disclosure, an information presenting method is provided. The method includes: displaying a first information page, in which, the first information page includes a first control and a second control, and the first control corresponds to a first tab page and a second tab page; and presenting, in response to detecting a first switching operation of switching a tab page displayed on the first information page from the first tab page to the second tab page, a tab of the second tab page in the second control.

According to one or more embodiments of the present disclosure, the first control and/or the second control is a tab page switching control.

According to one or more embodiments of the present disclosure, in response to detecting the first switching operation, the method further includes: switching the first tab page displayed on the first information page to the second tab page; switching, in the first control, a display mode of the tab of the first tab page from a first display mode to a second display mode; and switching, in the first control, a display mode of the tab of the second tab page from the second display mode to the first display mode; and/or the presenting the tab of the second tab page in the second control includes: displaying the tab of the second tab page in the second control through the first display mode.

According to one or more embodiments of the present disclosure, the method further includes: switching, in response to detecting a second switching operation of switching the displayed first information page to displaying a second information page, the displayed first information page to the second information page, in which, the second information page includes the second control; and presenting a tab of the tab page that meets a preset condition in the second control.

According to one or more embodiments of the present disclosure, the presenting the tab of the second tab page in the second control includes: presenting the tab of the second tab page in a preset position of the second control; and the presenting the tab of the tab page that meets the preset condition in the second control includes: presenting the tab of the tab page that meets the preset condition in the preset position of the second control.

According to one or more embodiments of the present disclosure, the tab page that meets the preset condition may be one of the following: a tab page presented last before the second switching operation, a tab page with longest dwell time within a preset time period before the second switching operation, a tab page with most user interactions within the preset time period before the second switching operation, and a tab page of an associated user of the user that has longest dwell time within the preset time period before the second switching operation.

According to one or more embodiments of the present disclosure, the tab page that meets the preset condition is the second tab page.

According to one or more embodiments of the present disclosure, the method further includes: presenting, in response to detecting a preset operation on a tab presented in the preset position of the second control, the first information page.

According to one or more embodiments of the present disclosure, the presenting the first information page includes: presenting the second tab page on the first information page; or sequentially presenting the first tab page and the second tab page on the first information page.

According to one or more embodiments of the present disclosure, an information presenting apparatus is provided. The apparatus includes: a display apparatus which is configured to display a first information page, in which, the first information page includes a first control and a second control, and the first control corresponds to a first tab page and a second tab page; and the display apparatus is further configured to present, in response to detecting a first switching operation of switching the tab page displayed on the first information page from the first tab page to the second tab page, a tab of the second tab page in the second control.

According to one or more embodiments of the present disclosure, an electronic device is provided which includes: one or more processors; and a storage apparatus having one or more programs stored thereon, in which, when executed by the one or more processors, the one or more programs cause the one or more processors to implement any one of the above-described methods.

According to one or more embodiments of the present disclosure, a computer-readable medium with a computer program stored thereon is provided, in which, the program, when executed by a processor, implements any one of the above-described methods.

The above description is merely description of some preferred embodiments of the present disclosure and technical principles applied thereto. Those skilled in the art should understand that the scope of invention involved in the embodiments of the present disclosure is not limited to the technical solution formed by the specific combination of the above-described technical features, and should also cover, without departing from the above-described inventive concept, other technical solutions formed by any combination of the above-described technical features or equivalent features thereof. For example, a technical solution is formed by mutually replacing the above-described features with the technical features disclosed (but not limited to) in the embodiments of the present disclosure with similar functions.

The invention claimed is:

1. An information presenting method, comprising:
 displaying a first information page on a device, wherein the first information page is configured to display a plurality of tab pages;
 displaying a first control and a second control on the first information page, wherein the first control is configured to implement a function of indicating which one of the plurality of tab pages is currently displayed on the first information page, and the second control is a control configured to trigger a particular function that is different from the function of the first control;
 detecting a first switching operation of switching from a first tab page to a second tab page performed on the first control, wherein the first tab page and the second tab page are among the plurality of tab pages;
 presenting a tab corresponding to the second tab page in the second control on the first information page in response to switching from the first tab page to the second tab page on the first information page;
 detecting a second switching operation of switching the first information page to a second information page, wherein the second information page is different from the first information page;
 displaying the second information page in response to detecting the second switching operation;
 displaying the second control on the second information page;
 presenting at least one tab corresponding to at least one of the plurality of tab pages in the second control on the second information page;
 detecting a preset operation performed on the at least one tab presented in the second control on the second information page; and
 displaying the first information page in response to detecting the preset operation.

2. The method according to claim 1, wherein in response to detecting the first switching operation, the method further comprises:
 switching the first tab page displayed on the first information page to the second tab page;
 switching, in the first control, a display mode of a tab of the first tab page from a first display mode to a second display mode;
 switching, in the first control, a display mode of the tab of the second tab page from the second display mode to the first display mode; or
 displaying the tab of the second tab page in the second control through the first display mode.

3. The method according to claim 1, wherein the presenting the tab of the second tab page in the second control comprises:
 presenting the tab of the second tab page in a preset position of the second control, and
 the presenting the tab of the tab page that meets the preset condition in the second control comprises:
 presenting the tab of the tab page that meets the preset condition in the preset position of the second control.

4. The method according to claim 1, wherein the tab page that meets the preset condition is one of the following: a tab page presented immediately before the second switching operation, a tab page with longest dwell time within a preset time period before the second switching operation, a tab page with most user interactions within the preset time period before the second switching operation, and a tab page of another user associated with a user that has longest dwell time within the preset time period before the second switching operation.

5. The method according to claim 1, wherein, the tab page that meets the preset condition is the second tab page.

6. The method according to claim 1, wherein, the displaying the first information page in response to detecting the preset operation further comprises:
 presenting the second tab page on the first information page; or
 sequentially presenting the first tab page and the second tab page on the first information page.

7. An information presenting apparatus, comprising:
 at least one memory communicatively coupled to the at least one processor and storing instructions that upon execution by the at least one processor cause the at least one processor to:
 display a first information page on a device, wherein the first information page is configured to display a plurality of tab pages;
 display a first control and a second control on the first information page, wherein the first control is configured to implement a function of indicating which one of the plurality of tab pages is currently displayed on the first information page, and the second control is a control configured to trigger a particular function that is different from the function of the first control;
 detect a first switching operation of switching from a first tab page to a second tab page performed on the first control, wherein the first tab page and the second tab page are among the plurality of tab pages;

present a tab corresponding to the second tab page in the second control on the first information page in response to switching from the first tab page to the second tab page on the first information page;

detect a second switching operation of switching the first information page to a second information page, wherein the second information page is different from the first information page;

display the second information page in response to detecting the second switching operation;

display the second control on the second information page;

present at least one tab corresponding to at least one of the plurality of tab pages in the second control on the second information page;

detect a preset operation performed on the at least one tab presented in the second control on the second information page; and display the first information page in response to detecting the preset operation.

8. The apparatus according to claim 7, wherein in response to detecting the first switching operation, the instructions that upon execution by the at least one processor further cause the at least one processor to:

switch the first tab page displayed on the first information page to the second tab page;

switch, in the first control, a display mode of a tab of the first tab page from a first display mode to a second display mode;

switch, in the first control, a display mode of the tab of the second tab page from the second display mode to the first display mode; and display the tab of the second tab page in the second control through the first display mode.

9. The apparatus according to claim 7, wherein presenting the tab of the second tab page in the second control comprises:

presenting the tab of the second tab page in a preset position of the second control, and wherein presenting the tab of the tab page that meets the preset condition in the second control comprises:

presenting the tab of the tab page that meets the preset condition in the preset position of the second control.

10. The apparatus according to claim 7, wherein the tab page that meets the preset condition is one of the following: a tab page presented immediately before the second switching operation, a tab page with longest dwell time within a preset time period before the second switching operation, a tab page with most user interactions within the preset time period before the second switching operation, and a tab page of another user associated with a user that has longest dwell time within the preset time period before the second switching operation.

11. The apparatus according to claim 7, wherein, the tab page that meets the preset condition is the second tab page.

12. A non-transitory computer-readable medium with a computer program stored thereon, wherein, when executed by the processor, the program causes the processor to implement operations comprising:

displaying a first information page on a device, wherein the first information page is configured to display a plurality of tab pages;

displaying a first control and a second control on the first information page, wherein the first control is configured to implement a function of indicating which one of the plurality of tab pages is currently displayed on the first information page, and the second control is a control configured to trigger a particular function that is different from the function of the first control;

detecting a first switching operation of switching from a first tab page to a second tab page performed on the first control, wherein the first tab page and the second tab page are among the plurality of tab pages;

presenting a tab corresponding to the second tab page in the second control on the first information page in response to switching from the first tab page to the second tab page on the first information page;

detecting a second switching operation of switching the first information page to a second information page, wherein the second information page is different from the first information page;

displaying the second information page in response to detecting the second switching operation;

displaying the second control on the second information page;

presenting at least one tab corresponding to at least one of the plurality of tab pages in the second control on the second information page;

detecting a preset operation performed on the at least one tab presented in the second control on the second information page; and displaying the first information page in response to detecting the preset operation.

* * * * *